(12) United States Patent
Spriestersbach

(10) Patent No.: US 7,337,180 B2
(45) Date of Patent: Feb. 26, 2008

(54) DISPLAYING DATA TABLES IN USER INTERFACES

(75) Inventor: Axel Spriestersbach, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 560 days.

(21) Appl. No.: 10/324,092

(22) Filed: Dec. 20, 2002

(65) Prior Publication Data

US 2004/0122839 A1   Jun. 24, 2004

(51) Int. Cl.
   *G06F 17/30* (2006.01)
(52) U.S. Cl. .................... 707/101; 707/104.1
(58) Field of Classification Search .......... 707/1–10, 707/100–104.1, 200–206; 709/246; 715/500, 715/513, 734–736
See application file for complete search history.

(56) References Cited

U.S. PATENT DOCUMENTS

| | | | | |
|---|---|---|---|---|
| 5,752,016 A | * | 5/1998 | Whittaker et al. ............. 707/3 |
| 6,023,714 A | * | 2/2000 | Hill et al. .................... 715/513 |
| 6,314,426 B1 | * | 11/2001 | Martin et al. ............... 707/100 |
| 6,593,943 B1 | * | 7/2003 | MacPhail .................... 715/734 |
| 6,950,990 B2 | * | 9/2005 | Rajarajan et al. ........... 715/736 |
| 6,983,331 B1 | * | 1/2006 | Mitchell et al. ............ 709/246 |
| 7,051,080 B1 | * | 5/2006 | Paul et al. .................. 709/217 |
| 2004/0133848 A1 | * | 7/2004 | Hunt et al. ................. 715/500 |

* cited by examiner

*Primary Examiner*—Yicun Wu
(74) *Attorney, Agent, or Firm*—Fish & Richardson P.C.

(57) ABSTRACT

A user interface including data display elements and a data selection element corresponding to each data display element. The data selection elements can be operable to select data for display in the corresponding data display element. The user interface can also include a display manager to update the data display elements with the data selected by the data selection elements.

11 Claims, 10 Drawing Sheets

DISPLAYING DATA TABLES IN USER INTERFACES

TECHNICAL FIELD

This disclosure relates to user interfaces, and more particularly to displaying data tables in user interfaces.

BACKGROUND

Tables of data, such as spreadsheets or tables in web applications, can include several columns and rows of data. Because conventional personal computer monitors have large viewing areas, many columns and rows can be viewed simultaneously on a personal computer monitor. Additionally, personal computer input devices, such as keyboards and computer mice, enable great freedom in navigating tables of data.

Portable devices that display data, for example handheld computers, personal digital assistants (PDAs), and mobile phones, can have limited display areas. Because of the limitations on the viewing area of portable device displays as compared to personal computer monitors, less data can be viewed simultaneously on a portable device display than a personal computer monitor. For example, a table of data that can be viewed in its entirety on a personal computer monitor may not fit on a portable device display.

Also, portable display devices can have less input freedom when compared to a personal computer. For example, a mobile phone can have a keypad with fewer buttons than a personal computer keyboard, and can have a limited number of scrolling keys that give less freedom than a computer mouse. Furthermore, because of the limited size of many portable devices, the input keypad and scrolling keys can be more cumbersome than the larger keyboard keys and computer mice used with personal computers.

SUMMARY

In one implementation, a user interface can include data display elements and a data selection element corresponding to each data display element. The data selection elements can be operable to select data for display in the corresponding data display element. The data can include columns. The user interface can also include a display manager to update the data display elements with the data selected by the data selection elements. The display elements can be objects. The user interface can also include a browser to manage the displaying of the data display elements on a display. Each data selection element can be operable to receive user input. The user interface can be at least partially implemented using a web programming language, for example wireless markup language (WML) code.

In another implementation, groups of data can be selected for display. The groups can include a subset of a data set. The selected groups of data can be transmitted to a display device. Information identifying groups comprising the entire data set can also be transmitted to the display device. Selecting groups of data can include evaluating user input and determining a number of columns that can be displayed on a display.

In another implementation, a data table can be received and display limitations can be determined. Data columns can be selected from the data table. The selected data columns can include a subset of the data from the data table. The selected data columns can then be displayed. A command can be received, and the selecting of data columns can include evaluating the command. A menu element can be provided for selecting a data column.

In another implementation, a system can include a server. The server can include a data selector to select a subset of data from a table of data and generate a set of identifiers identifying groups of data from the table of data. The system can also include a communicator to transmit the subset of data and the set of identifiers to a portable device. The data selector can be configured to select the subset of data based on a command from the portable device. The data selector can also be configured to select the subset of data based on user input. The portable device can include a mobile device, such as a mobile phone. The subset of data can include data columns, and the set of identifiers can include data column titles.

In another implementation, a portable device can include a display, a communicator to receive data, and a processor including a data selector to select a subset of the data from the table to display on the display. The portable device can also include display elements to display the selected data, menu elements corresponding to each display element to collect data selection input from a user, and a browser to manage the display of the data on the display. The communicator can receive a complete data table. The portable device can include a mobile phone.

In another implementation, an application can include a group selection code segment operable to select groups of data from a data table, a list generation code segment operable to generate a list of identifiers identifying groups from the data table, and a data transmission code segment operable to transmit the selected groups and list identifiers to a display device. The groups of data can include data columns. The group selector code segment can select groups of data based on a command from the display device.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
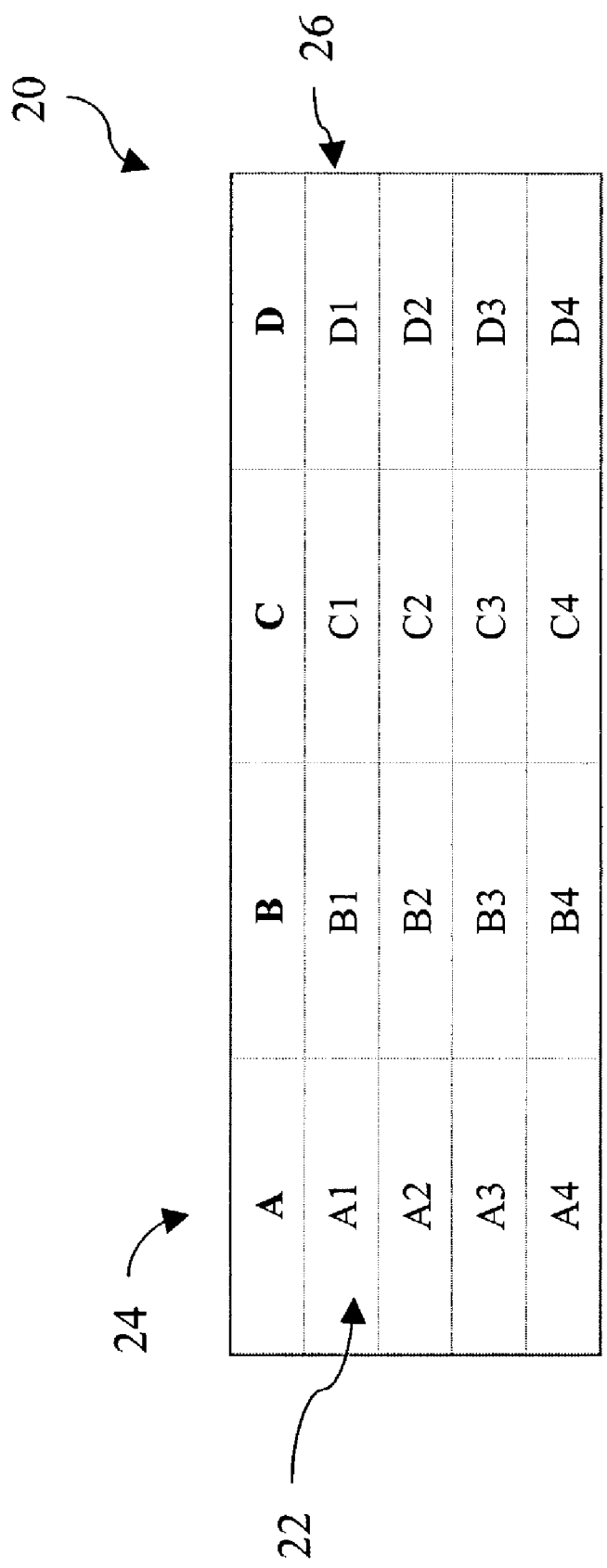
FIG. 1 is a table of data.

FIG. 1 shows an example of a table of data 20, or spreadsheet. The data is arranged in columns 24 and rows 26. A data cell 22 can be identified by a corresponding row and column. For example cell 22, identified by column 24 and row 26, holds the data A1. In some implementations, each column of data may be referenced by a title, or identifier. For example, the column 24 including data A1, A2, etc., is titled column A. The example spreadsheet 20, which includes four columns and four rows of data, can be displayed in its entirety on a conventional personal computer monitor. However, the spreadsheet may be too large to display in its entirety on a portable device display, such as a mobile phone display.

Figure 2:
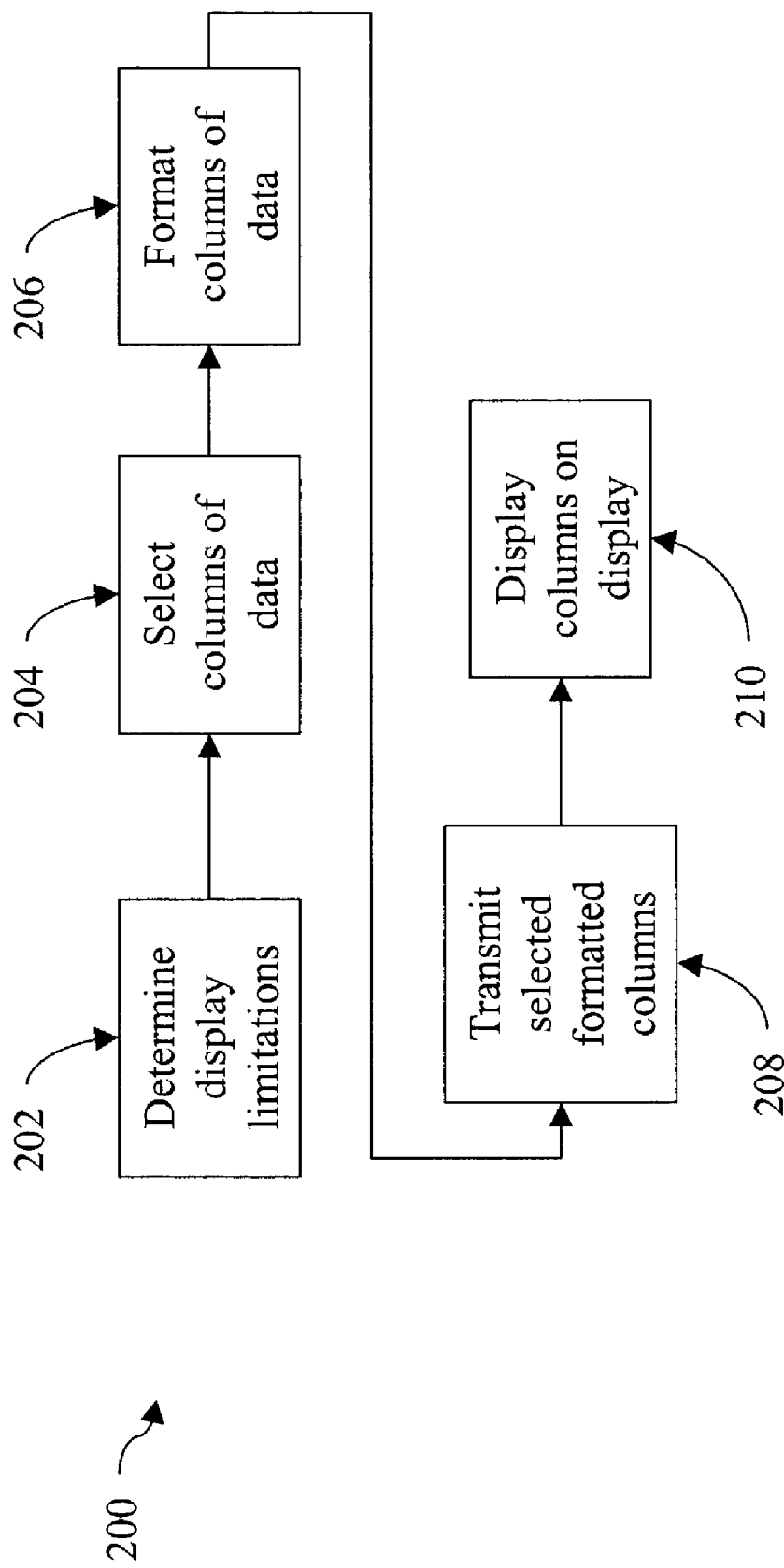
FIG. 2 is a flow chart of a method of displaying a subset of a table of data on a portable device display.

FIG. 2 shows a method (200) of displaying a subset of the spreadsheet on a portable device display, such as a mobile phone display. In some implementations, the portable device display limitations can be determined (step 202). For example, the system may determine the number of columns that the portable device can simultaneously display. Columns can then be selected for display (step 204). This can include selecting a subset of the total number of columns. For example, a user can select columns for display. After selecting columns for display, those columns can be formatted to fit the portable device display (step 206). The selected formatted columns can then be transmitted to the portable device (step 208), which can display the columns on the portable device display (step 210). Alternatively, rows, including a subset of the total number of rows, can be selected, formatted, and displayed.

Figure 3:
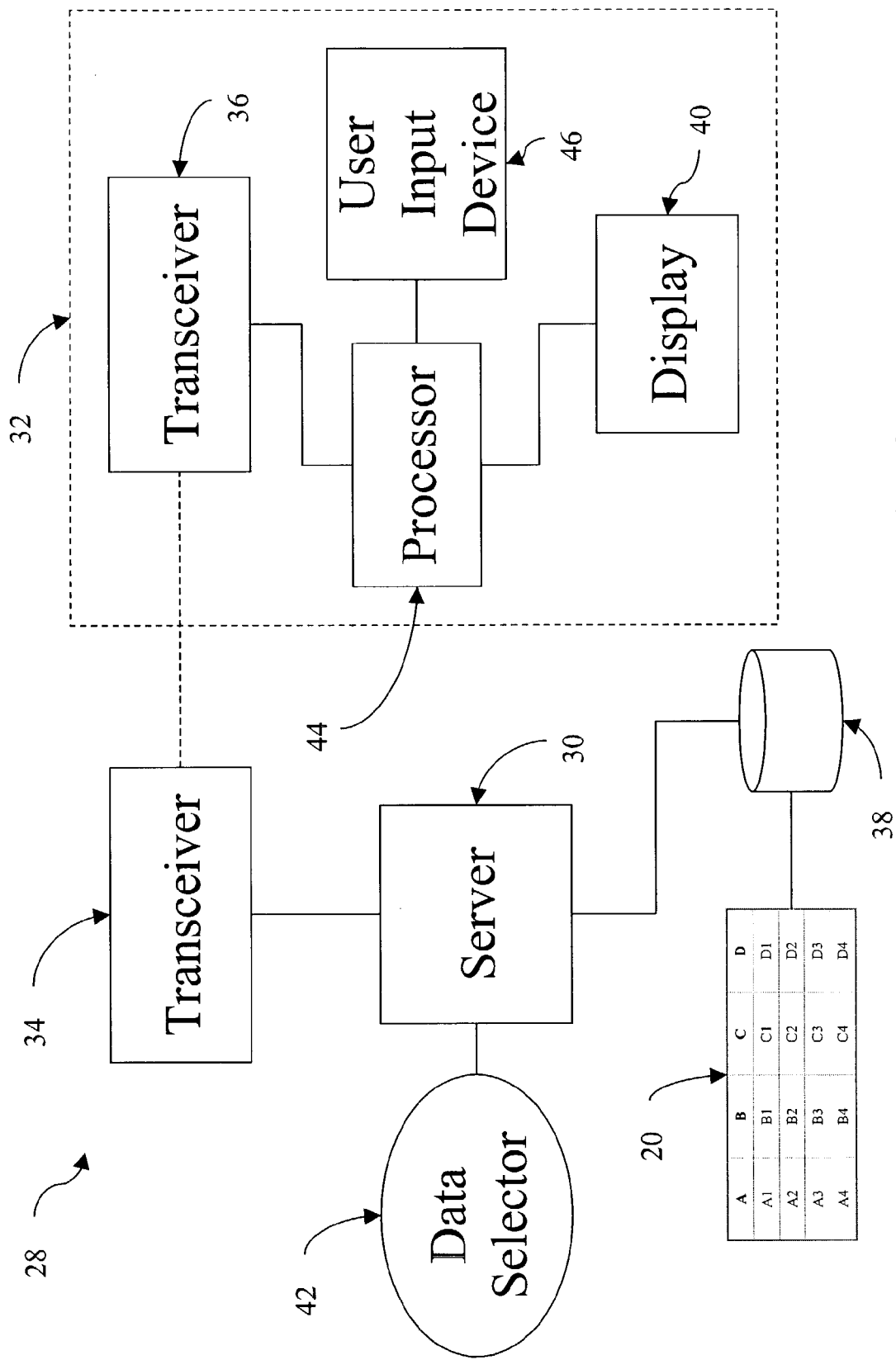
FIG. 3 is a block diagram of a system for displaying data on a portable device display.

FIG. 3 shows a system 28 for displaying tables of data on portable device displays. The system includes a server 30 to transmit data to a portable device 32, such as a mobile phone or a PDA. The server uses a transceiver 34 to transmit data to and receive data from the portable device 32. The data can be transmitted in a format such as wireless markup language ("WML"), hyper-text markup language ("HTML"), extended markup language ("XML"), or Java. The portable device 32 also includes a transceiver 36 to transmit and receive data from the server 30. The portable device 32 can be a WAP-enabled device. The table of data 20 is stored in a data repository such as a memory 38 connected to the server 30. The portable device 32 includes a display 40, which can have certain parameters, such as the number and configuration of pixels the display 40 can support. These parameters define limitations of the display 40. The portable device 32 can transmit these limitations to the server 30. The server 30 can include a data selector 42 to select a subset of the data from the table of data 20 in the memory 38 based on the portable device display parameters. For example, the data selector 42 can determine the number of data columns that can fit on the display 40 and select only that number of columns. Once the data selector has selected the subset of columns, those columns can be transmitted to the portable device 32. The portable device 32 includes a processor 44 for processing the columns of data, which can be displayed on the display 40.

The columns can be selected based on selection information from the portable device 32. For example, a user of the portable device can select specific columns to be displayed using a user input device 46, such as mobile phone keypad, which can include scrolling keys and keys associated with one or more international character sets. The portable device processor 44 can translate the user input from the input device 46 into the selection information, which can then be transmitted to the server 30. The data selector 42 can use the selection information to select columns to transmit to the portable device 32.

Figure 4:
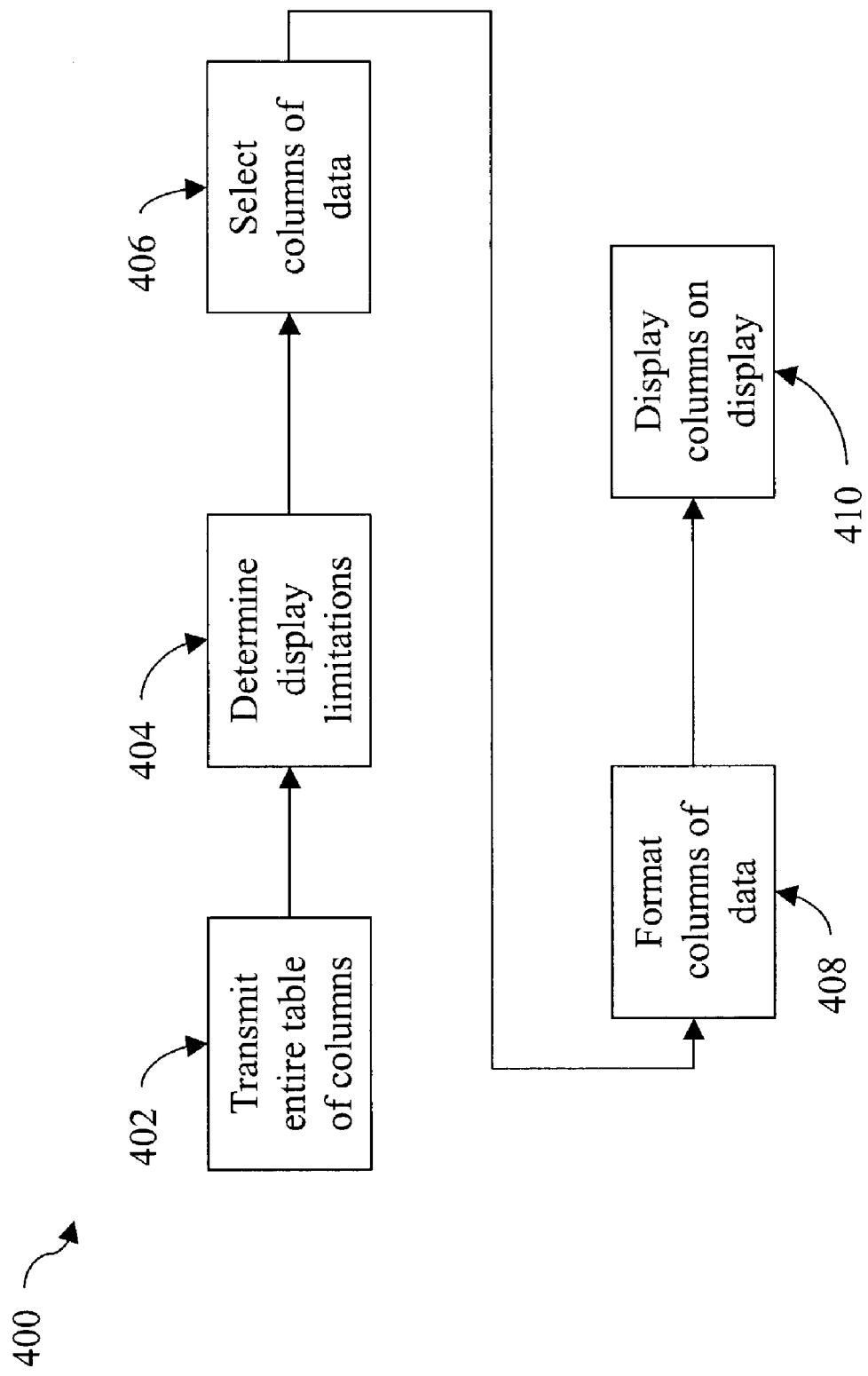
FIG. 4 is a flow chart of a method of displaying a subset of a table of data on a portable device display.

FIG. 4 shows a method (400) of displaying a subset of the spreadsheet 20 on the portable device display 40. In some implementations, the entire table of data 20 can be transmitted to the portable device 32 (step 402). The portable device 32 can then determine the display limitations (step 404), and select columns (or rows) of data from the table of data 20 (step 406). After selecting columns for display, those columns can be formatted to fit the portable device display 40 (step 408). The columns can then be displayed on the portable device display 40 (step 410).

Figure 5:
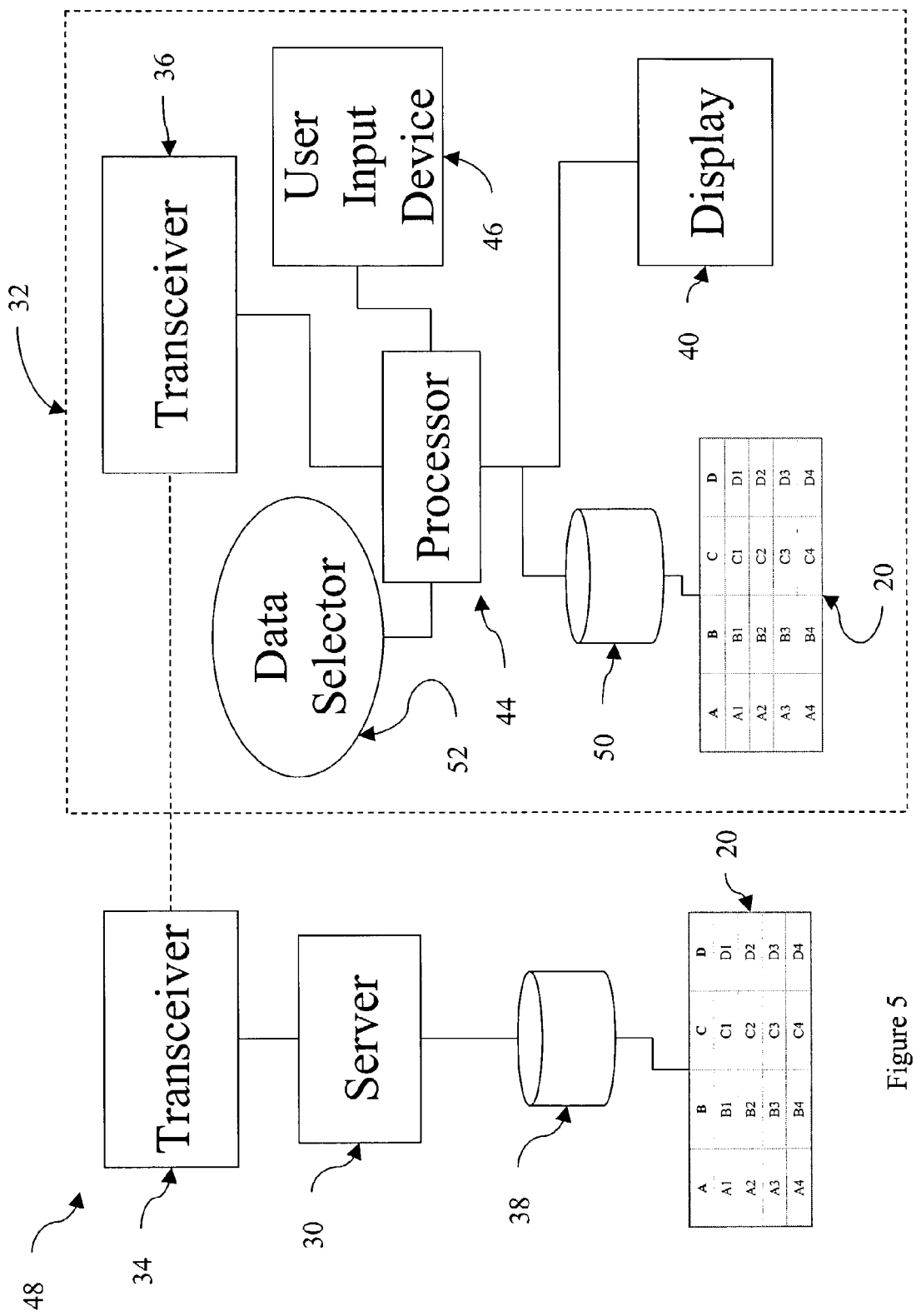
FIG. 5 is a block diagram of a system for displaying data on a portable device display.

FIG. 5 shows a system 48 for displaying tables of data on portable device displays. The system 48 includes the server 30 to transmit data to the portable device 32. The server 30 uses the transceiver 34 to transmit data to and receive data from the portable device 32. The portable device 32 includes the transceiver 36 to transmit and receive data from the server 30. The table of data 20 can be stored in the memory 38 connected to the server 30. The entire table 20 can be transmitted to the portable device 32, which can store the table 20 in a memory 50. The portable device 32 includes the display 40, which can have certain parameters that define limitations of the display 40. The portable device 32 includes the processor 44, which can include a data selector 52 to select a subset of the data from the table of data 20 in the memory 50 based on the portable device display parameters. For example, the data selector 52 can determine the number of data columns that can fit on the display 40 and select only that number of columns. Once the data selector 52 has selected the subset of columns, those columns can be formatted by the processor 44 and displayed on the display 40.

The columns can be selected based on selection information from the portable device 32. For example, the user of the portable device 32 can select specific columns to be displayed using the user input device 46. The portable device processor 44 can translate the user input from the input device 46 into the selection information. The data selector 52 can use this selection information to select columns for display.

Figure 6:
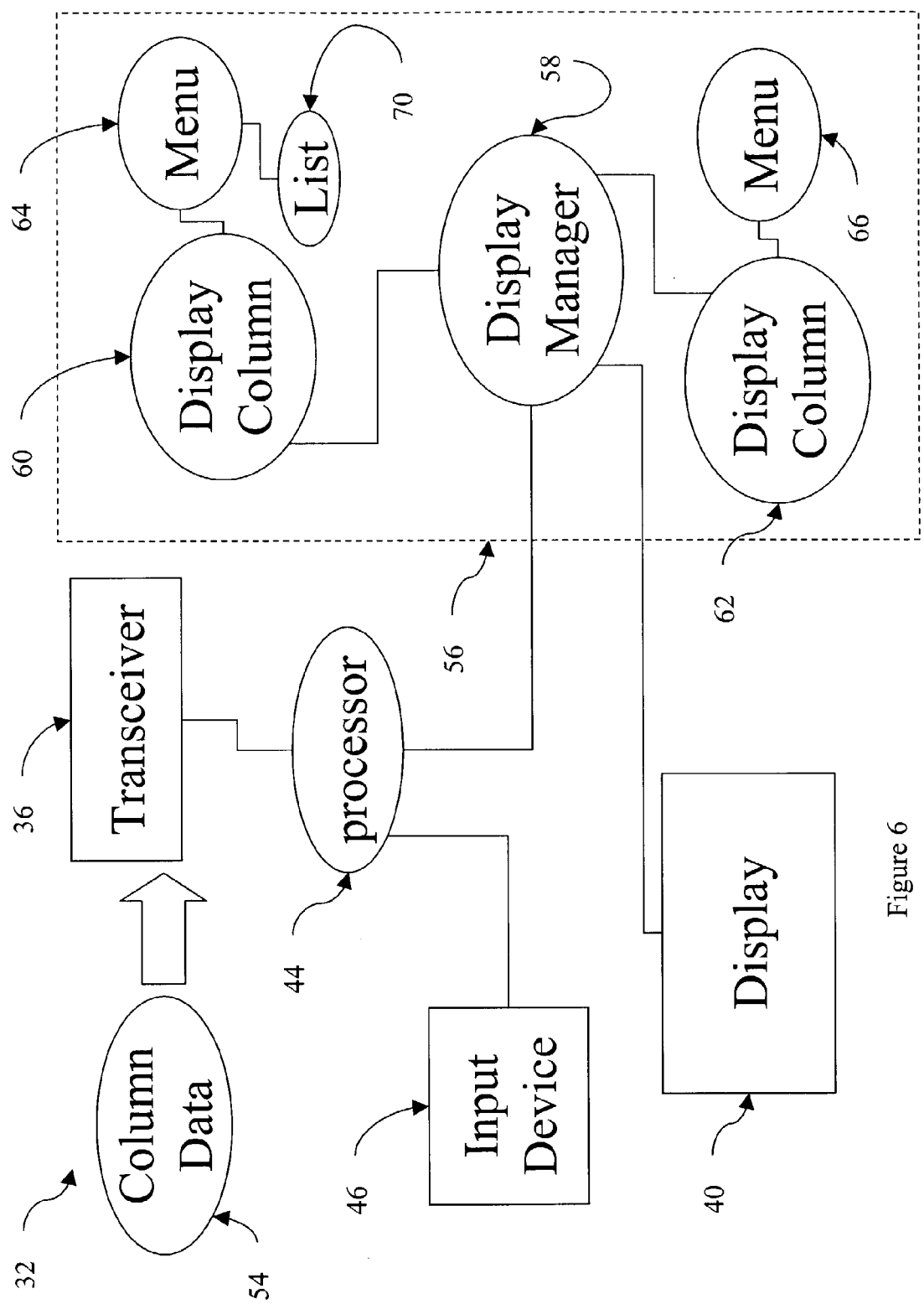
FIG. 6 is a block diagram of a processing architecture for a portable device.

The processor 44 can manage the displaying of the columns on the display 40 using a user interface. FIG. 6 shows a processing architecture for the portable device 32 with the display 40. The portable device 32 can receive columns of data 54, which can be a subset of a table of data, using the transceiver 36. The processor 44 can control a user interface 56. The user interface 56 can include a display manager 58. The display manager 58 can receive display parameters, such as the display size in pixels. The display manager 58 can determine a number of columns that will be displayed, and can create an appropriate number of display column elements. The display column elements can be display column objects. For example, two display column elements 60, 62 are shown, although another number may be appropriate based on the size of the display. The display manager 58 can then populate each display column element 60, 62 with data from the received columns of data 54. The display column elements 60, 62 can then be displayed on the display 40.

The user interface 56 can also modify the displayed data based on user input. For example, a user can input display instructions using the input device 46, such as by pressing keys on the keypad and scrolling keys of a mobile phone. The processor 44 can receive the display instructions from the input device 46 and send them to the display manager 58. The display manager 58 can then modify what is displayed on the display 40. The user interface 56 provides elements on the display 40 to guide user interaction. For example, the user interface 56 can include menu elements 64, 66 corresponding to each display column element 60, 62. The menu elements 64, 66 can include menu objects. Each menu element 64, 66 can include a list 70 of the titles of the columns of data 54 from the data table 20. The user can use the keypad or scroll keys of the input device 46 to choose a title from the list 70, for example by scrolling through the list 70 until reaching a desired title and pressing an indicator key to indicate the selection of the title. For example, for the table of data shown in FIG. 1, the menu displays the choices "A", "B", "C", and "D".

Figure 7:
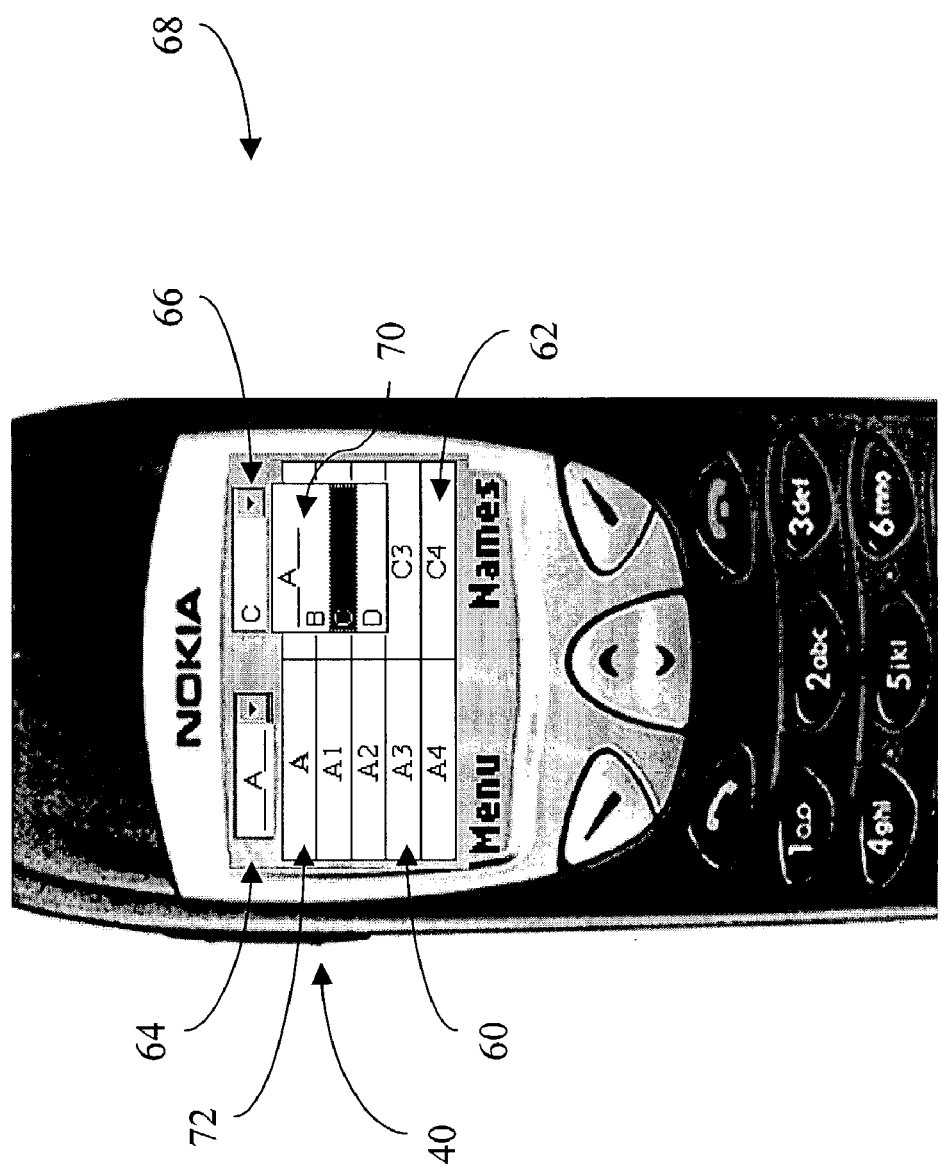
FIG. 7 is a diagram of a mobile phone displaying a subset of a table of data.

FIG. 7 shows a mobile phone 68 with a display 40 including two display column elements 60, 62 displaying a subset of the data from the data table 20 of FIG. 1. The display manager 58 can determine that two display columns can be displayed on the display 40 of the mobile phone 68. Each display column 60, 62 includes a title 72. For example, the column including data A1, A2, etc., is titled column A. Above each display column 60, 62 are the corresponding menu elements 64, 66. The user can use the mobile phone keypad to select a title from the list of titles 70 in the menu element (64 or 66). Menu element 66 is shown in a selection state, and the title "C" is shown as being selected.

The display manager 58 can receive the chosen title and send a request to the server 30 (shown in FIG. 3). The server 30 can process the request and send the column of data corresponding to the chosen title. The mobile phone 68 can receive the data using the transceiver 36, and the display manager 58 can populate the display column 62 with the chosen data and display the data on the display 40.

Figure 8:
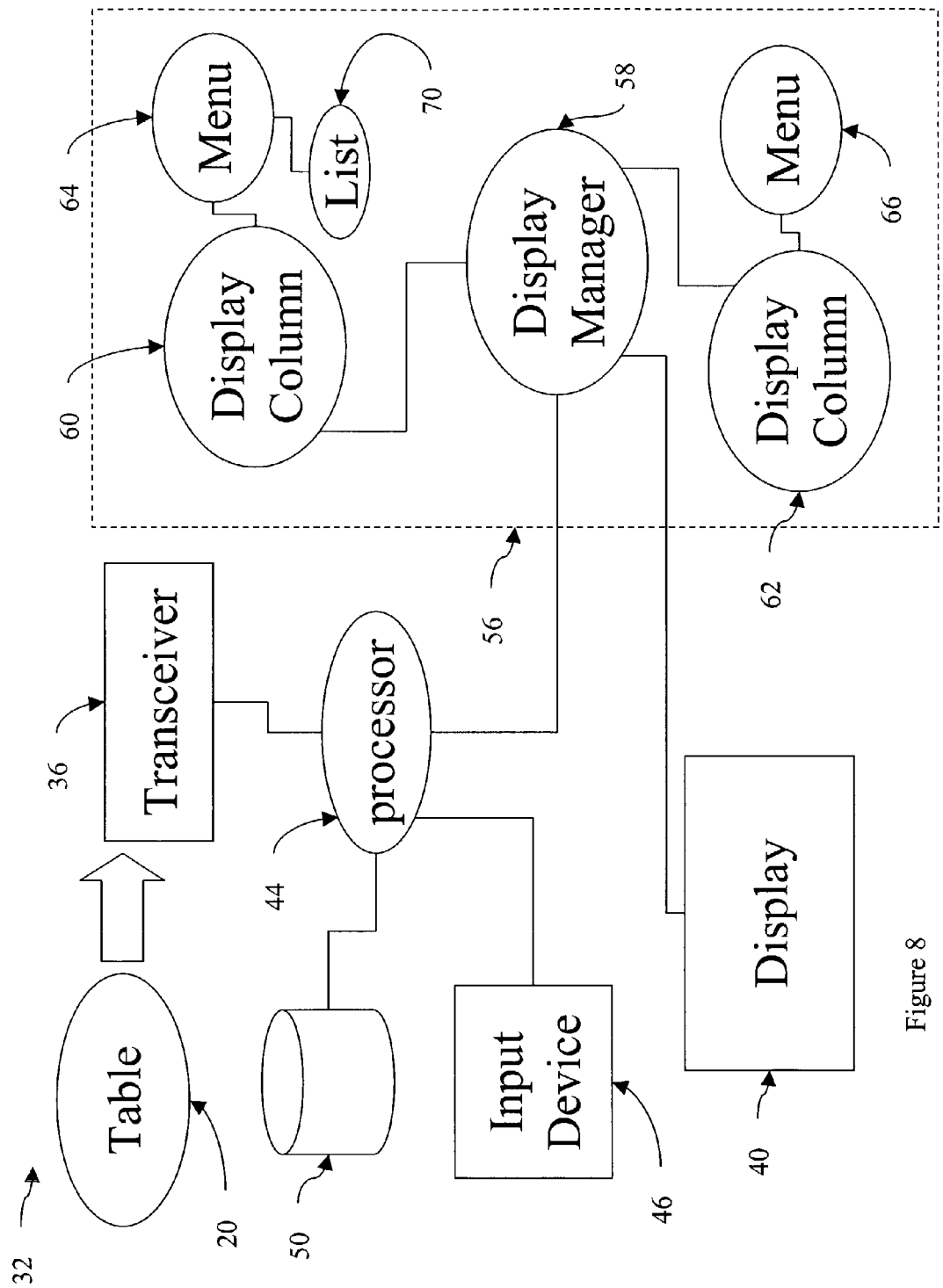
FIG. 8 is a block diagram of a processing architecture for a portable device.

Alternatively, as described above, the portable device 32 can receive the entire table of data 20 and display a subset of the data on the display 40. FIG. 8 shows the portable device 32 with the display 40. The portable device 32 can receive the entire table of data 20 using the transceiver 36. The table of data 20 can be stored in the memory 50. The processor 44 can manage the displaying of the columns on the display 40 using the user interface 56. The user interface 56 can include the display manager 58. The display manager 58 can receive display parameters, such as the display size in pixels. The display manager 58 can determine a number of columns that will be displayed, and can create the appropriate number of display column elements 60, 62. The display manager 58 can then request columns of data from the memory 50 and populate each display column element 60, 62 with columns of data. The display column elements 60, 62 can then be displayed on the display 40. As described above, the user interface 56 can also modify the displayed data based on user input, for example with menu elements 64, 66 corresponding to each display column 60, 62.

Figure 9:
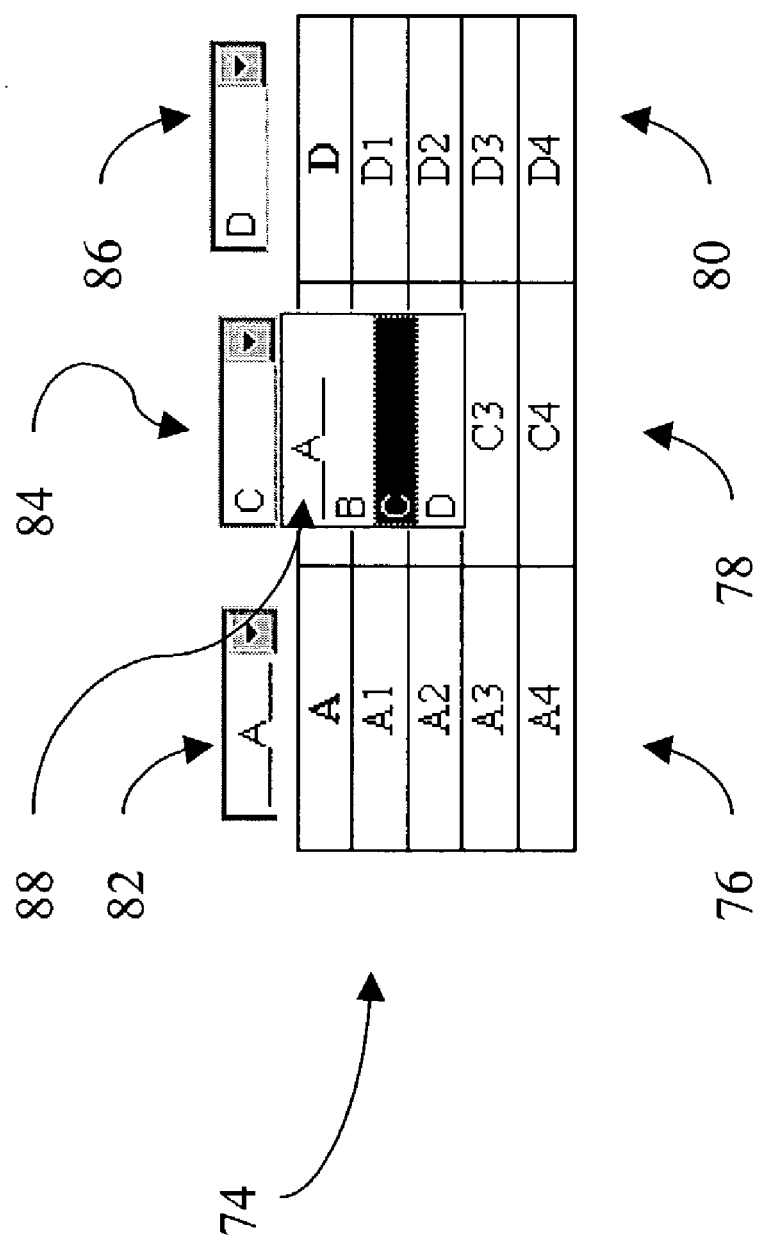
FIG. 9 is a subset of a table of data.

The display manager 58 can determine the appropriate number of columns to display on the display 40 based on properties of the display and properties of the data. For example, the display manager 58 can analyze the width of the display and the number of characters of data in the cells of the columns. For example, for the mobile phone display described in FIG. 7, the display manager 58 can analyze the small width of the screen and the number of characters in the cells of the columns, here two characters in each cell, and determine that two display column elements can be displayed on the display. For a larger display, for example a PDA display, more display column elements can be displayed. As FIG. 9 shows, a user interface 74 can include three display columns 76, 78, 80, and menu elements 82, 84, 86 corresponding to each of the display columns 76, 78, 80. The user can use the user interface device to first select a menu element (82, 84, 86) and then select a title from a list of titles 88. Menu element 84 is shown in a selection state, and the title "C" is shown as being selected.

Alternatively, the server 30, shown in FIG. 3, can determine an appropriate number of columns to display on the display 40 based on the properties of the display 40 and the data. For example, the portable device 32 can send the server display properties information. The server 30 can analyze the display properties, such as the width of the display 40, and the properties of the data, such as the number of characters in the cells of the columns, and determine the number of display column elements that can be displayed on the display 40. The server 30 can then send the portable device 32 the appropriate number of columns of data.

Figure 10:
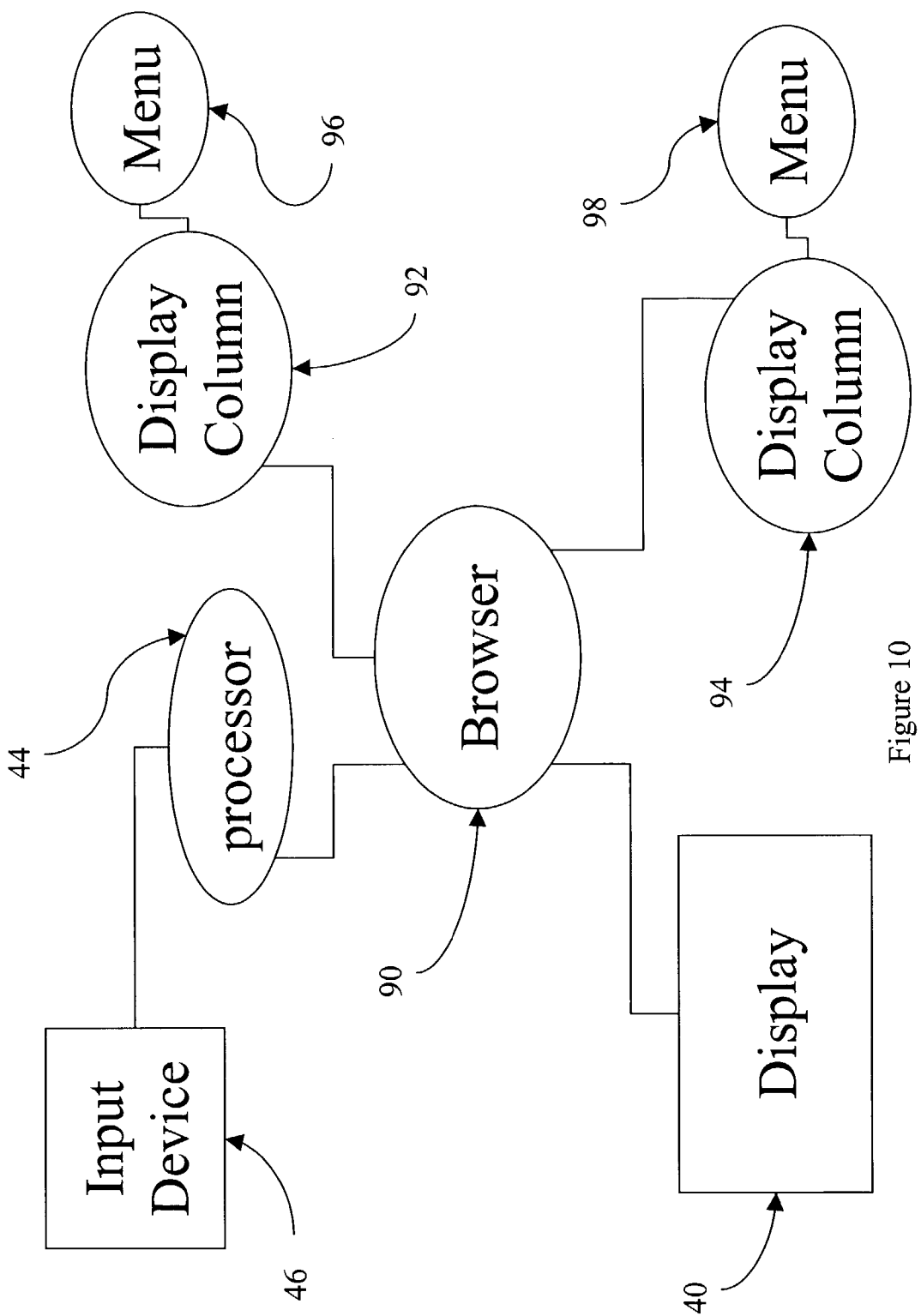
FIG. 10 is a block diagram of a processing architecture for a portable device.

As FIG. 10 shows, the portable device 32 can include a browser 90 and the user interface 56 can include WML modules. The WML modules can include standard tags that can be interpreted by the browser. The browser 90 can instantiate display column widgets 15 92, 94, populate them with the corresponding data, and display them on the display 40. The browser 90 can also instantiate menu widgets 96, 98, populate them with the columns titles, and display them on the display 40. The browser 90 also can manage the input of data through the input device 46, for example by translating the input device input into visual behavior on the display 40. Alternatively, the user interface 56 can be implemented using other software languages. For example, the user interface 56 can include HTML modules, XML modules, or Java modules.

A number of implementations have been described. Nevertheless, it will be understood that various modifications may be made. Accordingly, other implementations are within the scope of the following claims.

What is claimed is:

1. A computer program product, tangibly stored on a computer-readable medium, providing a user interface for displaying a subset number of columns of a data table, the computer program product being operable to cause a data apparatus to perform operations comprising:

receiving display parameters defining a number of pixels supported by a display of a portable device;

determining a subset number of columns of a data table based on comparing the display parameters to a width of a column of the data table;

displaying the subset number of display elements, each of the display elements used to display a column of the data table;

displaying, for each of the display elements, a menu element corresponding to a list of column titles;

accepting a user input via a user input unit of the portable device for each of the menu elements; and populating each display element with a column of the data table based upon the user input.

2. The computer program product of claim 1, wherein the display elements are objects.

3. The computer program product of claim 1, in which each menu element is operable to receive user input.

4. The computer program product of claim 1, wherein the menu elements are at least partially implemented using a web programming language.

5. The computer program product of claim 1, wherein the menu elements are at least partially implemented using wireless markup language (WML) code.

6. The computer program product according to claim 1, wherein the display parameters includes display screen size.

7. The computer program product according to claim 1, wherein the data table includes more than two columns, and wherein the subset number is two.

8. The computer program product according to claim 1, wherein the menu element is a drop-down list.

9. The computer program product according to claim 1, wherein the user input is a keypad depression.

10. The computer program product according to claim 1, wherein the user input is a keypad scroll.

11. A computer program product, tangibly stored on a computer-readable medium, providing a user interface for displaying a subset number of columns of a data table on a mobile phone, the computer program product being operable to cause a data apparatus to perform operations comprising:

receiving, at the mobile phone, a data table via a transceiver of the mobile phone, the data table includes one or more data columns, each data column includes a column title;

storing the data table in a memory of the mobile phone;

receiving, at the mobile phone, display parameters defining a number of pixels supported by a display of the mobile phone;

determining, at the mobile phone, the subset number of columns of the data table fitting to the display based on comparing the display parameters to a width of a data column;

displaying the subset number of display elements, each of the display elements used to display a column of the data table;

displaying, for each of the display elements, a menu element corresponding to a list of column titles;

accepting a user input via a user input unit of the mobile phone to select a column title for each of the menu elements;

obtaining the subset number of data columns corresponding to the selected column titles from the memory of the mobile phone; and populating each display element with the obtained data columns.

* * * * *